(No Model.) 2 Sheets—Sheet 2.
J. A. SWANSON.
TOURIST'S BICYCLE BAG.
No. 575,536. Patented Jan. 19, 1897.
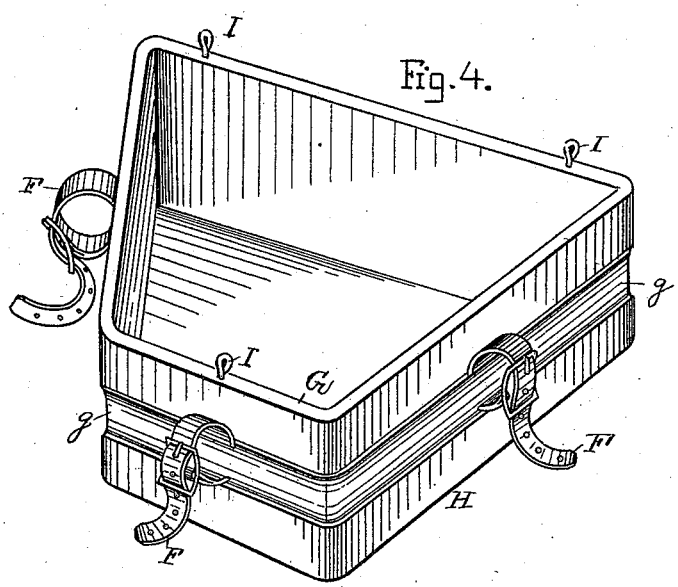
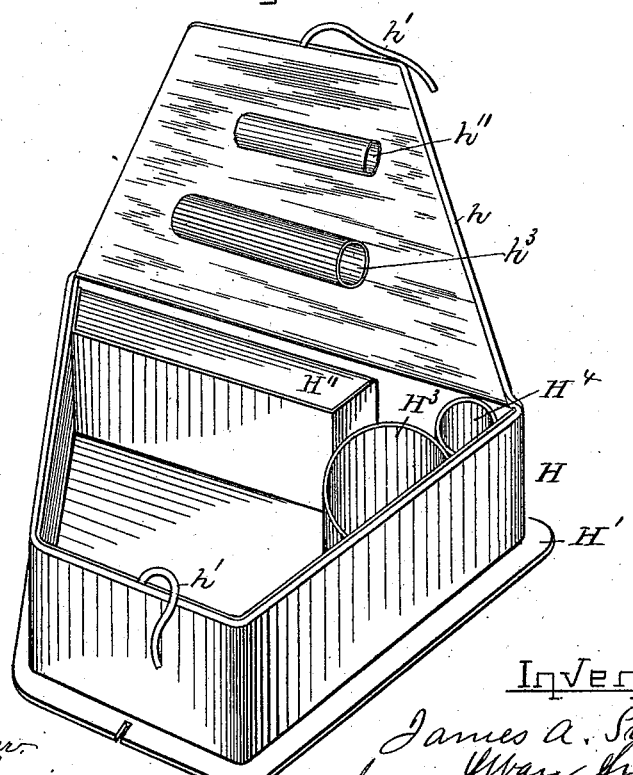
Witnesses.
Lauritz N. Möller
Charles A. Harris
Inventor.
James A. Swanson
by Ivan Andrén
his atty

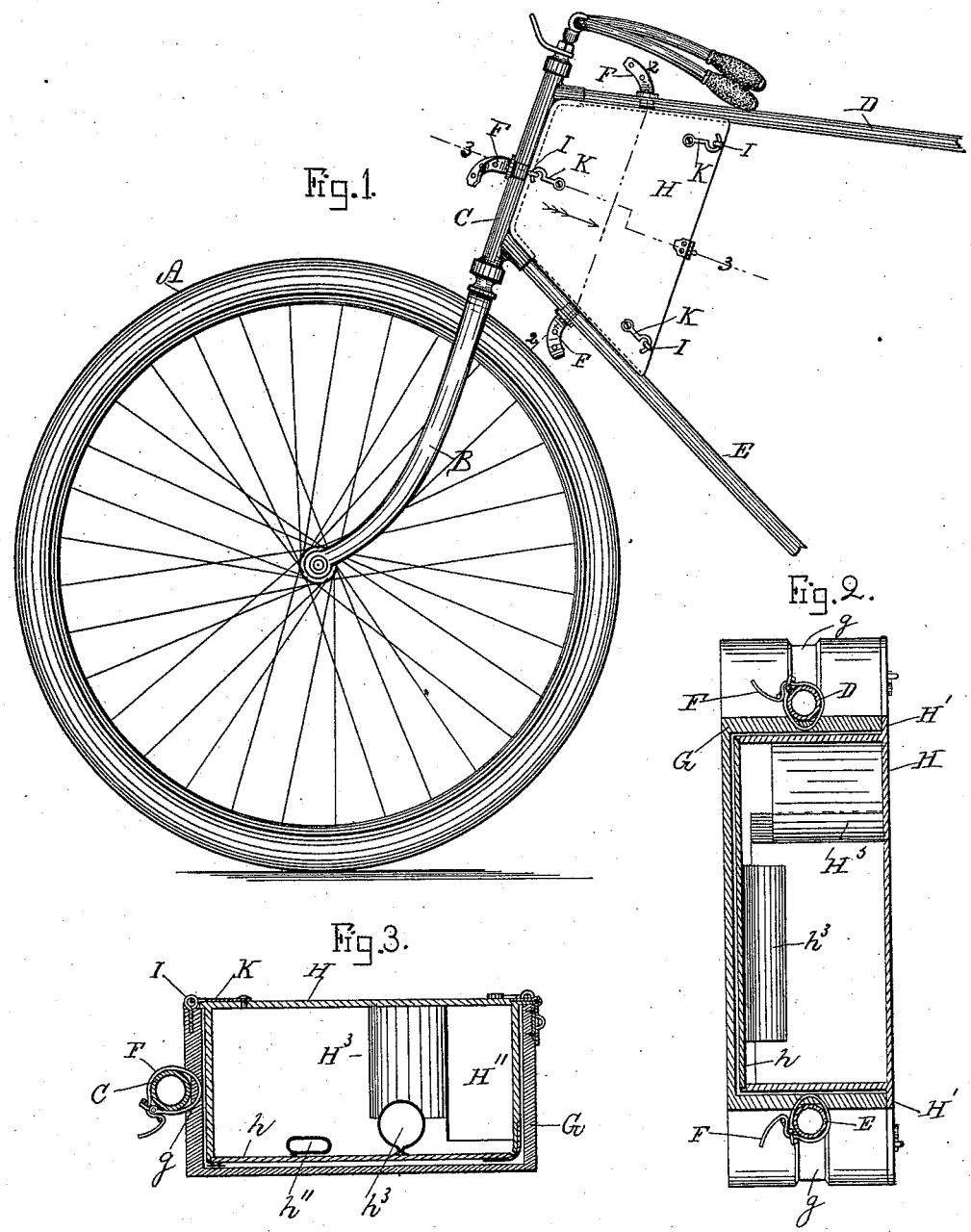

UNITED STATES PATENT OFFICE.

JAMES A. SWANSON, OF EVERETT, MASSACHUSETTS, ASSIGNOR OF ONE-HALF TO AXEL W. FRANKLIN, OF MALDEN, MASSACHUSETTS.

TOURIST'S BICYCLE-BAG.

SPECIFICATION forming part of Letters Patent No. 575,536, dated January 19, 1897.

Application filed July 6, 1896. Serial No. 598,119. (No model.)

*To all whom it may concern:*

Be it known that I, JAMES A. SWANSON, a citizen of Sweden, and a resident of Everett, in the county of Middlesex and State of Massachusetts, have invented new and useful Improvements in Tourists' Bicycle-Bags, of which the following, taken in connection with the accompanying drawings, is a specification.

This invention relates to improvements in tourists' bicycle-bags; and it is carried out as follows, reference being had to the accompanying drawings, wherein—

Figure 1 represents a side elevation of the forward portion of a bicycle, showing my improved tourist's bag in position thereon. Fig. 2 represents a cross-section on the line 2 2 in Fig. 1 shown as enlarged. Fig. 3 represents a similar enlarged cross-section on the line 3 3 shown in Fig. 1. Fig. 4 represents a perspective view of the outer case or holder adapted to be secured on the bicycle-frame; and Fig. 5 represents a perspective view of the bag, which is detachably secured to the case or holder.

Similar letters refer to similar parts wherever they occur on the different parts of the drawings.

In the drawings, Fig. 1, A represents the forward wheel of a bicycle; B, the fork; C, the head, and D E the braces of a bicycle-frame, as usual.

To the bicycle-frame parts C D E is secured, by means of straps F F F or other suitable or equivalent fastening devices, the case or holder G, which is open at one end, as shown in Figs. 2, 3, and 4, and provided on its periphery with grooves $g\ g\ g$, adapted to receive the frame parts C D E, as shown in Figs. 1, 2, 3, and 4, said grooves serving, in connection with the fastening devices F F F, for the purpose of securing the case or holder firmly and without rattling to the bicycle-frame.

The case or holder G may be made of any desired size and shape, according to the construction of the bicycle or velocipede for which the device is to be used.

Within the case or holder G is detachably secured the box or bag H, which is open at one end and there provided with a hinged lid or cover $h$, as shown in Figs. 1, 2, 3, and 5.

The said hinged cover may be held closed by means of tying-strings $h'\ h'$ or other equivalent fastening devices, as may be most practical and convenient.

The closed end or bottom of the box or bag H is provided with an outwardly-projecting flange H', adapted to close the open end of the case or holder G, as shown in Figs. 2 and 5.

When the device is in use, the box or bag H is held locked to the case or holder G by any suitable fastening device, and I have for this purpose shown in the drawings screw-eyes I I I, secured to the case G, adapted to be interlocked with hooks K K K, pivoted on the outside of the box H. Any other suitable or convenient fastening device may, however, be used without departing from the essence of my invention.

The interior of the box H may be divided in suitable compartments H'' H³ H⁴, as shown in Fig. 5, and the cover $h$ may likewise be provided with suitable receptacles $h''\ h^3$ for holding tools, toilet articles, or the like, as represented in Figs. 2, 3, and 5.

The interior of the case or holder G is formed with smooth and unbroken surfaces whereby the box H fits snugly and accurately therein, the grooves $g$ being formed on the exterior of the case or holder entirely, with no corresponding projection on its interior.

What I wish to secure by Letters Patent and claim is—

The herein-described bicycle-bag, consisting of a case or holder G having a smooth unbroken interior, and having grooves $g,\ g,\ g$, formed on the exterior of its sides and end for receiving the bicycle-frame, means for fastening said case to the frame, in combination with a detachable box H having a hinged cover $h$ at one end and fitted within the case or holder G, substantially as described.

In testimony whereof I have signed my name to this specification, in the presence of two subscribing witnesses, on this 15th day of June, A. D. 1896.

JAMES A. SWANSON.

Witnesses:
 ALBAN ANDRÉN,
 LAURITZ N. MÖLLER.